United States Patent Office 3,408,366
Patented Oct. 29, 1968

3,408,366
PROCESS FOR THE PRODUCTION OF ORTHO-HYDROXYBENZOPHENONES AND XANTHONES
Dwain M. White, Schenectady, N.Y., assignor to General Electric Company, a corporation of New York
No Drawing. Filed Aug. 11, 1967, Ser. No. 659,880
7 Claims. (Cl. 260—345.3)

ABSTRACT OF THE DISCLOSURE

This disclosure relates to a method for producing ortho-hydroxybenzophenones and xanthones by the thermal rearrangement of ortho-formyldiphenyl ethers. The process comprises heating an ortho-formyldiphenyl ether to a temperature of from about 100° C. to about 450° C. either in the presence or absence of a free radical initiator. It has been found that at these temperatures, the formyldiphenyl ether is rearranged to produce the ortho-hydroxybenzophenones and the xanthones. The yields of the xanthones can be increased by adding an oxidizing agent to the reaction mixture. The ortho-hydrobenzophenones produced in accordance with this process are useful as light stabilizers in plastic compositions; for example, in polyethylene, polypropylene, and the like.

In accordance with the process of the instant invention, an ortho-formylphenyl ether of the formula

I

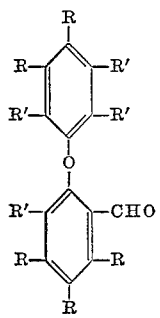

wherein R' is a member of the class consisting of alkoxy, containing from 1 to 18 or more carbon atoms or aryl containing from 6 to 18 carbon atoms and hydrogen, R is a member of the class consisting of hydrogen, alkyl groups, aryl groups and alkoxy groups, said alkyl, aryl and alkoxy groups containing from 1 to 18 or more carbon atoms, is heated in a reaction vessel to a temperature of from about 100° C. to about 450° C. in the presence or absence of a free radical initiator, whereby the phenyl ether spontaneously rearranges to yield a benzophenone of the formula:

II

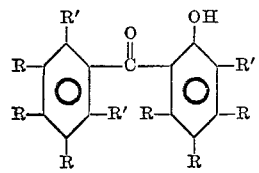

wherein R and R' are as above defined, and xanthones of the formula

III

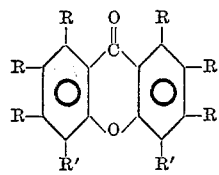

wherein R and R' is as above defined; the major product of the process of this invention being the benzophenones of Formula II.

It is, of course, obvious that in order to produce the xanthones of Formula III, at least one R' on the benzene ring free of the hydroxyl group must be hydrogen. In those instances where both of the R' groups are other than hydrogen, no xanthones of Formula III will be produced.

It has been found in conducting the process of this invention that the yield of the xanthones of Formula III can be increased by the addition of an oxidizing agent such as sulfur to the reaction mixture. The amount of the oxidizing agent added to the reaction system is not narrowly critical and can range from 0.1 to 10 parts, by weight, sulfur per 100 parts, by weight, of the ortho-formylphenyl ether of Formula I.

It has also been found that in conducting the process of this invention in the presence of a free radical initiator that the temperature of the reaction system can be maintained at a much lower temperature, that is in the range of 100° C. to 300° C. However, the use of the free radical initiator in the process of this invention is not preferred, inasmuch as the yields are low and by-products are formed which are difficult to separate from the reaction mixture. It is, therefore, preferred to conduct the reaction of the present invention at the elevated temperatures in the absence of any free radical initiator.

The temperature at which the process of the present invention is conducted is dependent upon the presence or absence of a free radical initiator. When a free radical initiator is not employed, temperatures in the range of 300° to 450° C. are necessary in order to obtain high yields of the benzophenones of Formula II in short periods of time. In order that the reaction time not be inordinately long, it is preferred to employ temperatures in the range of 300° to 450° C. or even higher. By employing temperatures in this range, side reactions are virtually non-existent and the products are recovered readily.

In conducting the process of this invention, it is preferred to employ an inert atmosphere in order to avoid side reactions and obtain highest yields. Thus, the reaction can be conducted in a glass vessel by drawing a vacuum on the vessel and sealing the vessel and subsequently heating the vessel to the temperature of the reaction and conducting the reaction under autogeneous pressure. An inert atmosphere can also be maintained by using nitrogen, helium, krypton, neon or any of the other inert gases, and operating the process at atmospheric or superatmospheric pressure.

Free radical initiators which can be employed in the process of this reaction are, for example, the organic peroxides, such as tertiary butyl hydro peroxides, ditertiary butyl peroxide, dibenzoyl peroxide, tertiary butyl peracetate, 2,5 - bis(tertiary butyl peroxy)-2,5-dimethylhexane, tertiary butyl perbenzoate, 1,4-dichlorobenzoyl peroxide, dicumyl peroxide, tertiary-butyl-tertiary-triptyl peroxide, etc., and compounds such as azo α-α'-azobisisobutyronitrile.

The aryl groups represented by R and R' are, for example, phenyl, naphthyl, biphenyl, etc.; the alkaryl groups represented by R and R' are, for example, tolyl, xylyl, ethylphenyl, etc.; the alkyl groups represented by R are, for example, methyl, ethyl, propyl, isopropyl, tertiary butyl, octadecyl, etc.; the aralkyl groups represented by R are, for example, benzyl, phenylethyl, phenylpropyl, etc.; the alkoxy groups represented by R and R' are, for example, methoxy, ethoxy, propoxy, butoxy, tertiary butoxy, octyloxy, decyloxy, octadecyloxy, etc.

The oxidizing agents which can be employed in the process of this invention to increase the yield of the xanthones include, for example, sulfur, selenium, sulfuric acid, sulfur trioxide, selenium oxide, manganese oxide, etc.

The hydroxy-containing benzophenones produced in accordance with this process find utility as ultraviolet absorbing additives to polymer systems such as polyethylene, polypropylene, and the like. The xanthones produced by the process of this invention can be converted to dihydroxybenzophenones by fusion with an alkaline reagent such as sodium hydroxide which dihydroxybenzophenones are useful as additives in plastics, for example, in polyethylene, polypropylene, etc., to protect the plastic from the degradating effects of ultraviolet irradiation.

The following examples serve to further illustrate this invention. All parts are by weight unless otherwise specifically stated.

Example 1

100 parts of ortho-formyldiphenyl ether was charged into a thick wall pyrex reaction tube. The tube was then sealed under vacuum and heated to 370° C. in an electric furnace for 1 hour. The tube was cooled to room temperature, opened and the contents analyzed and found to contain 50 parts of ortho-hydroxybenzophenone and 10 parts xanthone and 40 parts ortho-formyldiphenyl ether.

Example 2

100 parts of ortho-formyldiphenyl ether was charged into a tube as in Example 1, the tube sealed and the tube and contents heated in an electric furnace for 4 hours at 370° C. The tube was cooled to room temperature, opened and the contents analyzed and found to contain 70 parts of ortho-hydroxybenzophenone and 20 parts of xanthone.

Example 3

100 parts of ortho-formyldiphenyl ether was charged into the pyrex tube as in Example 1, and 5 parts sulfur was added and the tube sealed as in Example 1 and placed in the electric furnace and heated at 370° C. for 1 hour. After cooling to room temperature the tube was opened and contents analyzed and found to contain 50 parts ortho-hydroxybenzophenone and 45 parts of xanthone.

Example 4

100 parts of 2-formyl-4'-methyldiphenyl ether was charged into a thick wall pyrex reaction tube and the tube sealed as in Example 1. The tube was placed in an electric furnace and heated at 370° C. for four hours. After cooling to room temperature, the tube was opened and the contents analyzed and found to contain 65 parts of 2-hydroxy-4'-methylbenzophenone and 15 parts of 2-methyl xanthone,

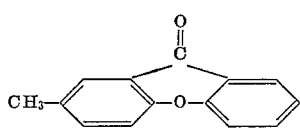

Example 5

100 parts of 2-formyl-4'-methyldiphenyl ether was charged into a pyrex tube as in Example 1. The tube was sealed as in Example 1 and placed in an electric furnace and heated to 300° C. for 67.5 hours. After cooling to room temperature, the tube was opened and the contents analyzed and found to contain 60 parts of 2-hydroxy-4'-methylbenzophenone and 10 parts of 2-methyl xanthone.

Example 6

100 parts of 2-formyl-4'-methoxydiphenyl ether was charged into a pyrex tube as in Example 1. The tube was sealed as in Example 1 and placed in the electric furnace and heated to 340°–380° C. for 1.1 hours. After cooling to room temperature, the tube was opened and the contents analyzed and found to contain 55 parts of 2-hydroxy-4'-methoxybenzophenone, 20 parts of 2-methoxy xanthone,

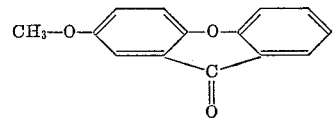

and 20 parts of the 2-formyl-4'-methoxydiphenyl ether starting material.

Example 7

100 parts of 2-formyl-4'-methoxydiphenyl ether was charged into a pyrex tube as in Example 1 and the tube sealed as in Example 1. The tube was placed in an electric furnace and heated to 300° C. for 24½ hours. After cooling to room temperature, the tube was opened and the contents analyzed and found to contain 45 parts of 2-hydroxy-4'-methoxybenzophenone and 35 parts of 2-methoxy xanthone and 10 parts of the 2-formyl-4'-methoxydiphenyl ether starting material.

Example 8

100 parts of 2-formyl-4'-methoxydiphenyl ether was charged into a pyrex tube and the tube sealed under vacuum as in Example 1. The tube was placed in an electric furnace and heated to 300° C. for 4.75 hours. After cooling to room temperature, the tube was opened and the contents analyzed and found to contain 3 parts of 2-hydroxy-4'-methoxybenzophenone and 3 parts of 2-methoxy xanthone and 94% of the starting material.

Example 9

100 parts of 2-formyl-4'-methoxydiphenyl ether was charged into a pyrex reaction tube as in Example 1. The tube was sealed as in Example 1 and placed in an electric furnace and heated to 420° C. for ¼ of an hour. After cooling to room temperature, the tube was opened and the contents analyzed and found to contain 70 parts of 2-hydroxy-4'-methoxybenzophenone and 10 parts of 2-methoxy xanthone.

Example 10

100 parts of 2-formyl-4'-methyldiphenyl ether and 8 parts of sulfur were charged into a pyrex reaction tube as in Example 1. The tube was sealed under vacuum as in Example 1 and placed in an electric furnace and heated to 300° C. for 1 hour. After cooling to room temperature, the tube was opened and the contents analyzed and found to contain 35 parts of 2-hydroxy-4'-methylbenzophenone and 30 parts 2-methyl xanthone.

Example 11

100 parts of 2-formyl-4'-methoxydiphenyl ether in a motor driven syringe was injected at a constant rate over a 20-minute period into the top of a glass tube packed with 200 parts 2 mm. glass beads and heated to 450° C. with an electric furnace. The pyrolysate was collected at the bottom of the tube in a flask. The pyrolysate was analyzed and found to contain 15 parts 2-hydroxy-4'-methylbenzophenone, 1 part 2-methoxy xanthone and more than 80 parts starting material.

Example 12

100 parts ortho-formyldiphenyl ether and 25 parts di-tertiarybutyl peroxide in 1000 parts chlorobenzene was heated at 132° C. for 16 hours. The products were analyzed and found to contain 7 parts ortho-hydroxybenzophenone and 10 parts xanthone.

It will, of course, be apparent to those skilled in the art that modification other than those set forth in the above examples can be employed in the process of this invention without departing from the scope thereof.

What I claim as new and desired to secure by Letters Patent of the United States is:

1. A process for producing benzophenone compositions of the formula

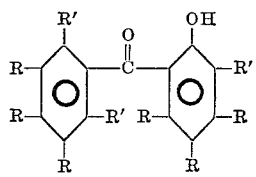

and xanthones of the formula

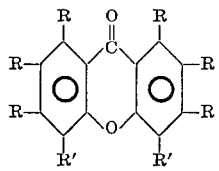

wherein R is a member of the class consisting of hydrogen, alkyl groups, aryl groups and alkoxy groups, said alkyl, aryl and alkoxy groups containing from 1 to 18 carbon atoms, and R' is a member of the class consisting of hydrogen, alkoxy groups containing 1 to 18 carbon atoms, and aryl groups containing 6 to 18 carbon atoms which comprises heating an ortho-formyldiphenyl ether of the formula

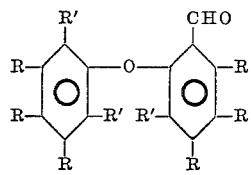

wherein R and R' are as above defined, to a temperature of from 100° C. to 450° C. when employing a free radical initiator or to a temperature of from 300° C. to 450° C. in the absence of a free radical initiator with the proviso that at least one R' group on the benzene ring free of the hydroxyl group is hydrogen when a xanthone is to be produced.

2. A process as claimed in claim 1 wherein the ortho-formyldiphenyl ether has the formula

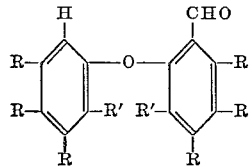

wherein R is a member of the class consisting of hydrogen, alkyl group, aryl groups and alkoxy groups, said alkyl, aryl and alkoxy groups containing from 1 to 18 carbon atoms and R' is a member of the class consisting of hydrogen, alkoxy groups containing from 1 to 18 carbon atoms, and aryl groups containing from 6 to 18 carbon atoms.

3. A process as claimed in claim 1 wherein an oxidizing agent is added to the ortho-formyldiphenyl ether.

4. A process as claimed in claim 2 wherein sulfur is added.

5. A process as claimed in claim 1 wherein the ortho-formyldiphenyl ether has the formula

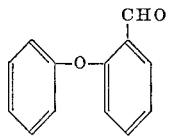

6. A process as claimed in claim 1 wherein the ortho-formyldiphenyl ether has the formula

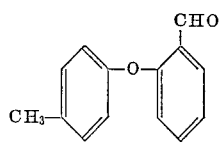

7. A process as claimed in claim 1 wherein the ortho-formyldiphenyl ether has the formula

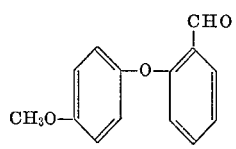

References Cited

UNITED STATES PATENTS 2,661,354    12/1963    Schmidle    260—591 XR

DANIEL D. HORWITZ, *Primary Examiner.*